(12) United States Patent
Ho

(10) Patent No.: US 7,336,433 B2
(45) Date of Patent: Feb. 26, 2008

(54) FOCUSABLE LASER COLLIMATOR

(76) Inventor: David Gian-Teh Ho, 23685 Ridgecrest Ct., Diamond Bar, CA (US) 91765

( * ) Notice: Subject to any disclaimer, the term of this patent is extended or adjusted under 35 U.S.C. 154(b) by 52 days.

(21) Appl. No.: 11/439,624

(22) Filed: May 23, 2006

(65) Prior Publication Data

US 2006/0268423 A1 Nov. 30, 2006

Related U.S. Application Data

(60) Provisional application No. 60/684,354, filed on May 25, 2005.

(51) Int. Cl.
*G02B 7/02* (2006.01)
*G02B 27/30* (2006.01)
*G01B 11/26* (2006.01)
(52) U.S. Cl. .................. 359/823; 359/641; 359/826; 356/153
(58) Field of Classification Search ................ 356/153; 359/636, 641, 710, 744, 823, 825
See application file for complete search history.

(56) References Cited

U.S. PATENT DOCUMENTS 5,113,291 A * 5/1992 Naiki ......................... 359/823
5,684,644 A 11/1997 Spears et al.
6,025,908 A 2/2000 Houde-Walter
6,366,349 B1 4/2002 Houde-Walter
6,526,089 B1 * 2/2003 Haeno et al. ................ 372/101

* cited by examiner

*Primary Examiner*—David N. Spector
(74) *Attorney, Agent, or Firm*—Christie, Parker & Hale, LLP.

(57) ABSTRACT

A laser collimator includes an optical lens having an optical axis; a sliding lens holder for housing the lens having a longitudinal opening parallel to the optical axis; a stationary lens holder ring for fitting to the front of the sliding lens holder and having a protruding key for receiving the longitudinal opening; and a focusing ring movable along the optical axis, wherein the protruding key placed within the longitudinal opening prevents the sliding lens holder from rotating.

14 Claims, 6 Drawing Sheets

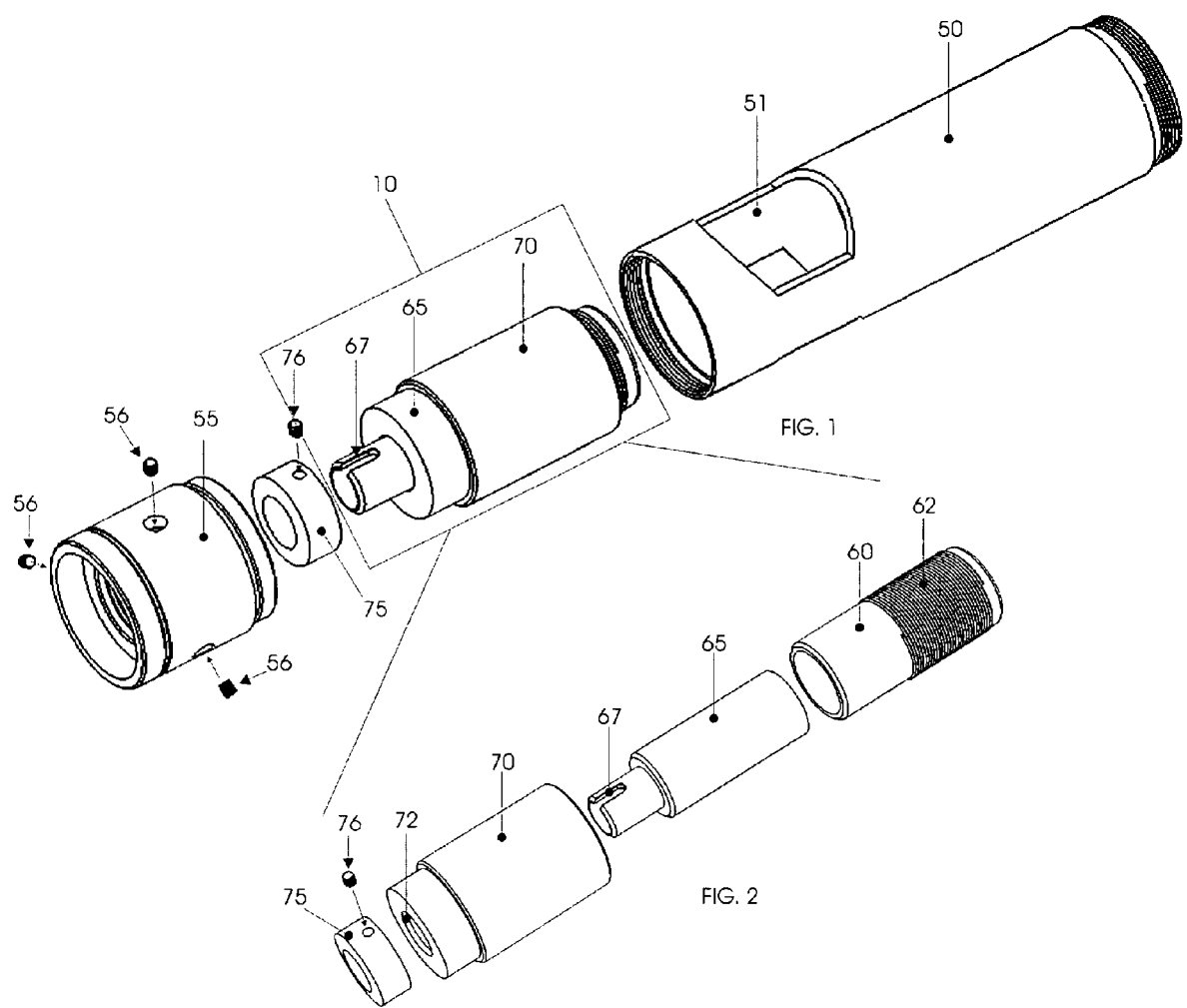

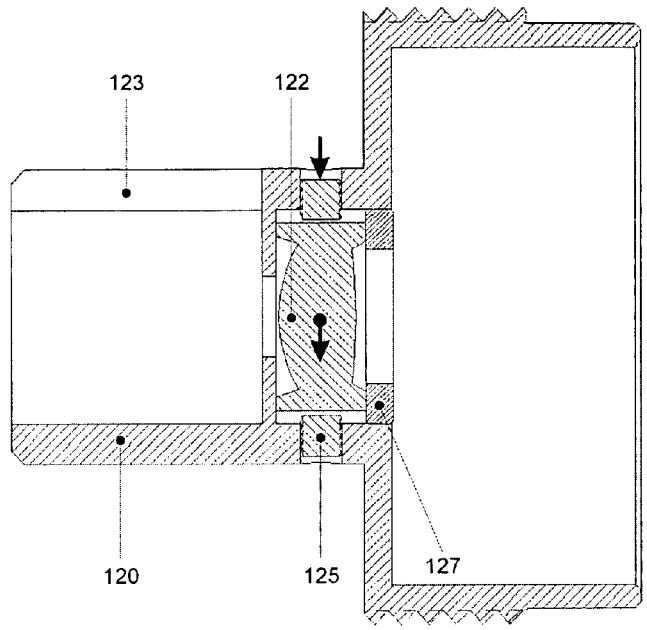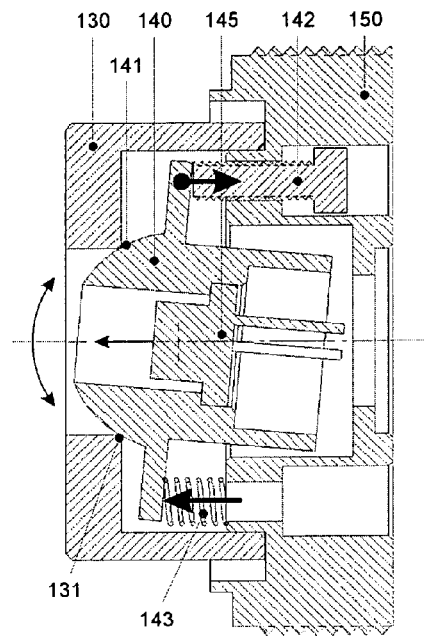
FIG. 10  FIG. 11
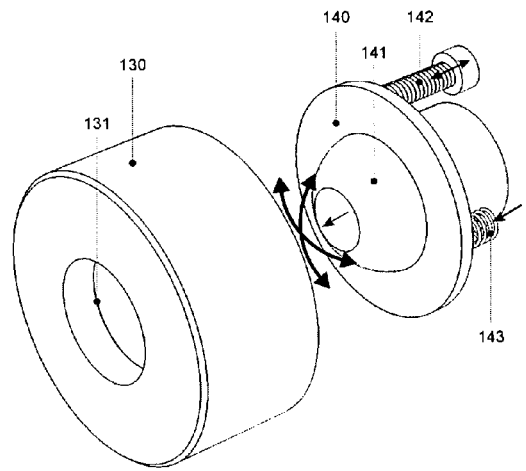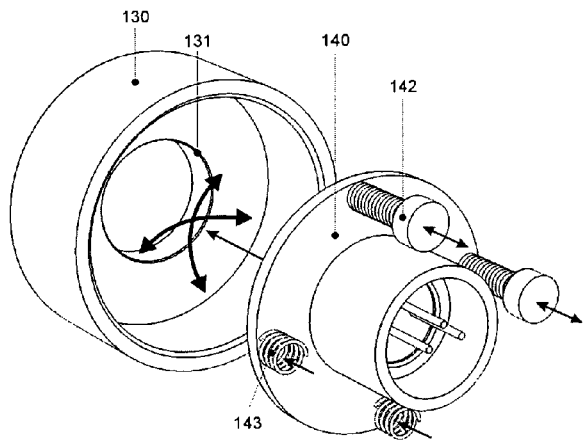
FIG. 12  FIG. 13

FOCUSABLE LASER COLLIMATOR

CROSS-REFERENCE TO RELATED APPLICATION

This Patent Application claims the benefit of the filing date of U.S. Provisional Patent Application Ser. No. 60/684,354, filed on May 25, 2005 and entitled "FOCUSABLE LASER COLLIMATOR," the entire content of which is hereby expressly incorporated by reference.

FIELD OF THE INVENTION

The present invention relates generally to alignment and focusing of laser devices; and more particularly to an externally focusable laser collimator.

BACKGROUND OF THE INVENTION

Currently, telescope users cannot take the full advantage of a fine laser spot to align a telescope at a finest point for achieving higher calibration resolution. This problem is specially evident in a fix-focused laser module installed in a laser collimator for a telescope A typical collimated laser module installed in a telescope laser collimator is fix-focused at infinity to achieve its maximum projection distance at the smallest divergent angle. In a conventional telescope, the effective focal length (EFL) of the telescope ranges from 1 to 20 feet. At this distance, the collimated laser spot size is almost equivalent to its initial aperture size. Thus, the laser spot appears quite large in this range. This makes it harder for the user to pinpoint the exact optical alignment axis.

Furthermore, the pointing errors of a low cost laser module, typically due to component manufacturing errors, contributes to the focusing problem. One of the problem is from the lens manufacturing process and the lens cap design of the laser module. Almost all lenses have mechanical centration errors due to manufacturing processes. For example, an un-calibrated off-centered grinding machine for glass lens, a none uniform temperature injection flow on a plastic parabolic surface during injection modling of the lens, manufacturing tooling errors causing an off-centered injection mold would contribute to centration errors. In a conventional focusing design for a laser diode module, the collimating lens is installed in a threaded lens cap and the focusing is adjusted by rotating the cap to produce longitude displacement from the laser diode. The lens rotation with the lens cap generates pointing errors from its centering tolerances. In reality, every time when a laser is focused in the conventional method, a laser spot circling is seen about the true center pointing axis on the projecting screen.

A common method for collimating a telescope with laser collimator is by magnifying the laser spot with a barlowed lens where the laser light expands large enough to cover a pre-installed donut shaped sticker in the center of the primary mirror. The return reflection displays a shadow of the black ring within a soft red patch of laser light on the viewing screen of the collimator. Then, the primary mirror is adjusted until the shadow of the black ring is around the exiting aperture of the laser. This method is known as Barlowed Laser Technique.

In another configuration of a collimation apparatus for a Schmidt-Cassegrain Telescope (SCT), the SCT employs a cored primary mirror. A cored primary mirror includes a hole in the center of the primary mirror. This hole renders the methods that rely upon dots, circles or markings at the center of the primary mirror useless. One solution is to set up the telescope point at a distant target outside of the telescope's closest focus distance. Then, align the optics in response to the reflected image by projecting a reticle image on the optics to be aligned, form a reflection of the reticle image from the optics, and display the reflected reticle image on the distance target. Again, the laser spot size is limited to the fixed-focused laser's initial aperature size.

Additionally, geometric alignment of telescope focuser, and optical alignment of the secondary mirror using the laser collimator have been impossible for the users, because the laser collimators do not provide a viewing window to view the projected laser spot on the projecting surface. The conventional laser collimators rely on the returning reflection image from the primary mirror to a viewing screen close to the laser exiting aperature.

In other words, in a telescope collimation using a laser collimator, a user cannot see the projected laser spot on the surface of the aligning optical element due to the location of the installed laser collimator, because the laser collimator is directly in the viewing path. The user typically has to calibrate the secondary mirror by peaking through the opening of the telescope to see the projecting image on the surface of the secondary mirror from the reflected image of primary mirror at a distance.

Therefore, there is need for a method and apparatus to improve the precision of calibration of an optical device, such as a telescope laser collimator.

SUMMARY OF THE INVENTION

In one embodiment, the present invention is a method and apparatus for externally adjusting the focus of a laser collimator, for example, for a telescope. The method and apparatus of the invention allows a user to compensate for various telescope lengths with different EFLs, focus the laser spot to the finest point, and align the optical elements along the optical axis. The user can also de-focus the laser spot to form a larger light source along its center axis to create Barlow effect without using additional magnifying optics for aligning various types of telescopes.

An embodiment of the invention also resolves the critical instrument alignment issue, that is, the optical alignment itself, at the focusing stage.

In one embodiment, the present invention is a laser collimator. The laser collimator includes an optical lens having an optical axis; a sliding lens holder for housing the lens, the sliding lens holder having a smaller diameter at a front and a larger diameter at a back and having a longitudinal opening parallel to the optical axis; a lens holder ring restricts the front of the sliding lens holder for longitudinal movement only and having a protruding key for receiving the longitudinal opening; a laser holder tube for holding a laser and having an external thread on an outer circumferential surface; and a focusing ring for receiving the back of the sliding lens holder and having internal thread on an internal circumferential surface. When the focusing ring is rotated, the internal thread of the focusing ring interacts with the external thread of the laser holder tube to move the focusing ring along the optical axis and the protruding key travels within the longitudinal opening while preventing the sliding lens holder from rotating.

In one embodiment, the present invention is a laser collimator. The laser collimator includes an optical lens having an optical axis; a sliding lens holder for housing the lens having a longitudinal opening parallel to the optical axis; a lens holder ring for fitting to the front of the sliding lens holder and having a protruding key for receiving the longitudinal opening; and a focusing ring movable along the optical axis, wherein the protruding key placed within the longitudinal opening prevents the sliding lens holder from rotating.

In one embodiment, the laser collimator includes a viewing tube for viewing a projected laser beam of the laser along a viewing axis. The viewing tube includes a mirror placed in the viewing tube forming an angle with the viewing axis and an eye piece focuser and the mirror includes a hole at its center to allow the laser beam pass through to reflect a projected image on a surface.

In one embodiment, the laser collimator includes a laser disk for holding the laser and having a spherical front with a hole for allowing the beam of the laser to pass through; and an alignment holder having a circular alignment opening at a front center. This way, the laser disk is rotatable within the circular alignment opening allowing the laser to pivot and rotate without displacement along the optical axis or in a plane orthogonal to the optical axis.

BRIEF DESCRIPTION OF THE DRAWINGS

FIG. 1 is an exemplary perspective view of an externally adjustable laser module assembly with its housing, according to one embodiment of the present invention.

FIG. 2 is an exemplary perspective view of the externally adjustable laser module assembly.

FIG. 10 is an exemplary perspective wire-frame view of positioning a collimation lens.

FIG. 11 is an exemplary cross-section view of an alignment module for pointing the laser.

FIG. 12 is an exemplary front perspective view of the alignment module for pointing the laser.

FIG. 13 is an exemplary perspective view from the back of the alignment module for pointing the laser.

DETAILED DESCRIPTION

Figure 3:
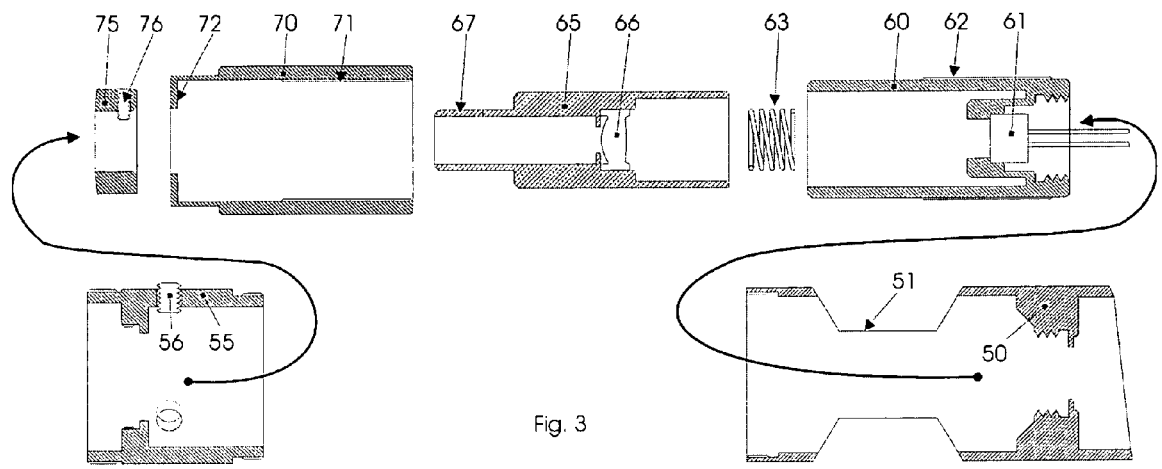
FIG. 3 is an exemplary cross-section view of an externally adjustable laser module assembly.

In one embodiment, the present invention is a method and apparatus for externally adjusting the focus of an optical element, for example, a laser collimator in a telescope.

An optical element is aligned in reference to an externally adjustable focus laser beam along with the optical axis for optimal projection image. This produces finer focused spot at a desirable projection distance. Further, using a detachable focusable viewer, a user can view the projected image on the surface of the aligning optical element for more accurate alignment reference.

The present invention allows the collimating lens to focus without loosing its optically pre-aligned axis. That is, the lens can be moved towards or away from the laser, without any rotation. In other words, a keyed collimating lens holder allows the alternation of focusing distance while maintaining the rotational longitude adjustment between the collimating lens and the light source (for example, a laser). This feature minimizes the lens centration errors due to tooling and manufacturing tolerances.

In one embodiment, the present invention is a method for aligning an optical element, for example, a focuser tube and a secondary mirror in a telescope. The method includes focusing a projecting light beam image on a projecting optical element and aligning the optical element in response to the focused projected and reflected spot.

In one embodiment, the present invention is an externally adjustable focus laser collimator. The adjustable focus laser collimator includes a focusing ring for adjusting the focusing distance of a projected light image and maintaining the rotational alignment axis between the focusing lens and the projection light. The collimator also includes a sliding lens holder that holds the collimating lens and has an longitudinal slot parallel to the optical axis of the collimating lens; a stationary lens holder ring that holds the sliding lens holder and has a key receiving the longitudinal slot of the sliding lens holder; a laser holder tube that holds the light source (e.g., laser) and has an external thread.

Additionally, the collimator includes a focusing ring that is rotatable about the sliding lens holder's optical axis and has interior threads for receiving exterior thread of the laser holder tube. The rotation of the focusing ring acting on exterior threads of the laser holder tube varies the longitudinal travel distance of the focusing ring along the slot on the sliding lens holder. The key on the lens holder ring inserted in the slot from the sliding lens holder fixes the rotational position of the sliding lens holder while alternating the longitude focusing distance between the collimating lens and the light source through the rotational threading of the focusing ring.

It is important that the telescope alignment process be able to project a fine laser spot or image at a desired viewing distance along its optical center axis during the telescope collimation. With an externally focusable laser, the device can accommodate any telescope (reflective and refractive) in terms of telescope length and EFL to achieve this primary objective for best calibration resolution.

In a reflective telescope collimation, a laser image is projected through an exiting aperture to reflect off a secondary mirror which directs it to the center of a primary mirror. The primary mirror reflects the beam back to the secondary mirror which then reflects it back to the exiting aperture of the laser. The complete return of the laser through the exiting aperture assures that the telescope is correctly aligned. To optimize the sharpest image possible from the returning laser image displayed on the viewing screen, focusing adjustment on the laser image is required. A focusing ring, according to the present invention allows a user to tailor to the optimal laser image for a precise alignment.

At this point, the focusing ring allows the user to tailor to an optimal laser image at the desired display target distance for best alignment resolution. This method can also apply to any reflective telescope. Alternatively, the laser spot can be de-focused just enough to create a projection shadow like a ring eclips from the secondary mirror onto a distance target. Then, the secondary mirror is aligned until the cast shadow is concentric to the projecting ring.

FIG. 1 is a perspective view of an externally adjustable laser module assembly with housing. FIG. 2 is a perspective view of the external adjustable laser module assembly and FIG. 3 is the cross-section view of the external adjustable laser module assembly. In order to keep the collimation lens centrically aligned along the optical alignment axis while focusing, a non-rotational lens holder is included to compensate the mechanical deviation of lens centration.

The module assembly includes the following parts as illustrated in FIGS. 1 and 3; a housing 50 with an opening 51 for laser focusing; a laser module 10; a stationary lens holder ring 75 having a key 76 (for example, a set screw) protruding toward the inner diameter; a main body cap 55 to enclose the laser module with the alignment screws 56.

In one embodiment, the laser module 10 includes the following parts as illustrated in FIGS. 2 and 3; a sliding lens holder 65 holds the collimating lens 66 with a longitudinal slot 67; a laser holder tube 60 with external threads 62; a focusing ring 70 having matching internal threads 71 (shown in FIG. 3) with the laser holder tube 60.

Figure 4:
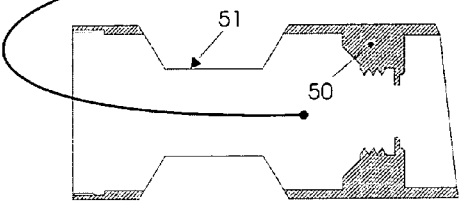
FIG. 4 is an exemplary illustration of adjusting a laser module assembly in a housing.
Figure 5:
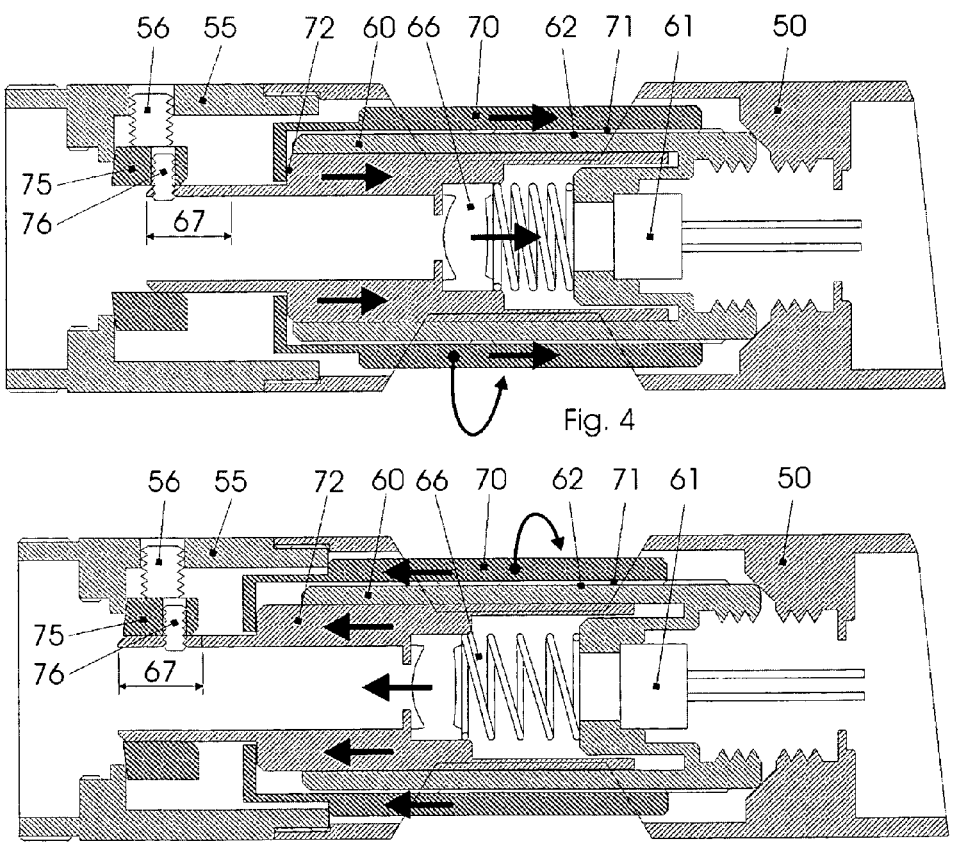
FIG. 5 is an exemplary illustration of de-focusing the laser module assembly in a housing.

FIGS. 4 and 5 illustrate a mechanism by which collimating lens 66 is hold in place, without rotation during the focusing stage. The sliding lens holder 65 is spring-loaded with a spring 63 in the laser holder tube 60 and is constrained by the focusing ring 70 against the action of the spring 63. Since the focusing ring 70 is threadedly received by means of the interaction of the interior threads 71 on the focusing ring 70 and external threads 62 on the laser holder tube 60, rotation of the focusing ring 70 causes relative longitudinal motion between the focusing ring 70 and laser holder tube 60. The longitudinal displacement of the focusing ring 70 forces the sliding lens holder 65 to move away or toward the light source 61.

The smaller diameter at front of the sliding lens holder 65 is constrained in the stationary lens holder ring 75 which allows only forward or backward movement. The longitudinal slot 67 located at the front of the sliding lens holder 65 receives the protruding set screw 76 from the stationary lens holder ring 75 to assure that the sliding lens holder 65 moves without rotation responsive to the threading of the focusing ring 70. The pointing of the assembled laser module is then calibrated with alignment keys 56, such as screws by shifting the x and y positions about the optical axis of the stationary lens holder ring 75 in reference to the center axis of the housing 50.

The focusing of the assembled and aligned laser module is then externally accessible via the opening 51 of the housing. As shown in FIGS. 4 and 5, the focusing ring 70 is partially exposed from the housing 50 allowing the user to adjust the focus from turning the focusing ring 70 for best focused image at a desired distance.

Figure 6:
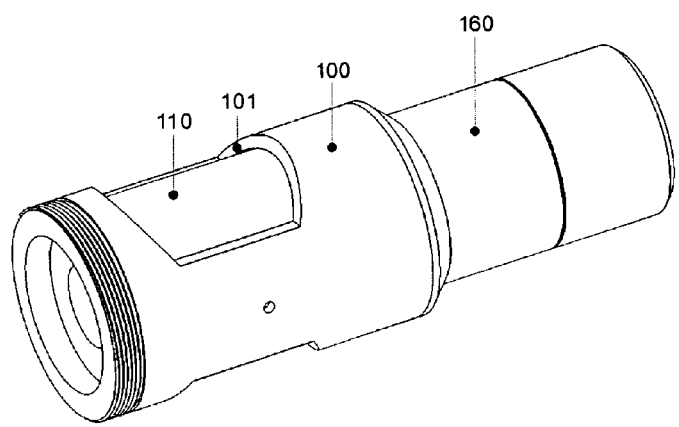
FIG. 6 is an exemplary perspective view of an assembled externally adjustable laser collimator, according to one embodiment of the present invention.

FIGS. 6 to 13 depict a laser collimator configuration capable of adjusting and calibrating the laser pointing to correct the manufacturing errors of laser diode pointing, according to one embodiment of the present invention. FIG. 6 is a perspective view of the assembly where a user can adjust the focus spot from the half exposed focusing ring 110 through the opening 101. The main body (housing) 100 is connected to a battery compartment 160.

Figure 7:
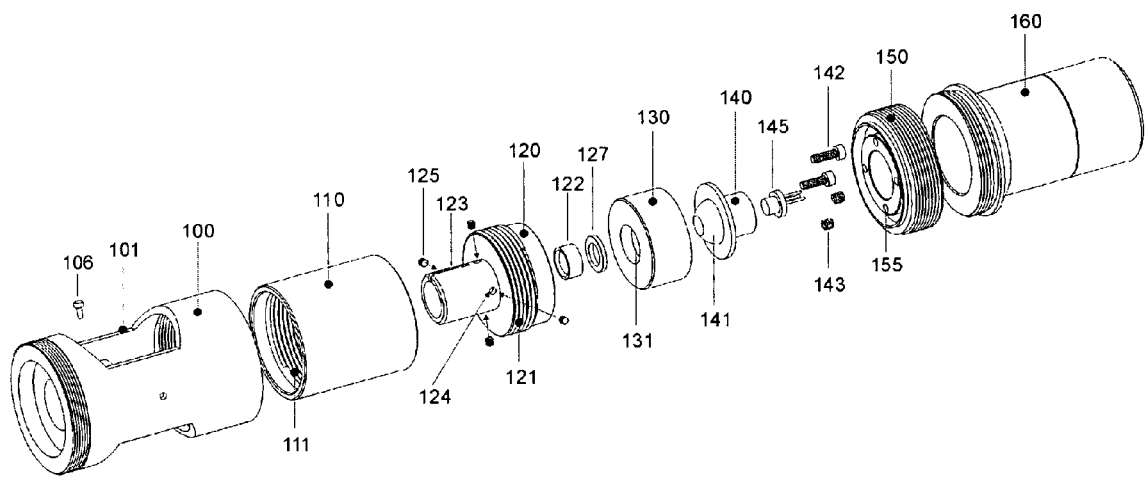
FIG. 7 is an exemplary perspective view of the externally adjustable laser collimator assembly.

FIG. 7 is a more detail diagram of a fucosable laser collimator assembly, according to one embodiment of the present invention. As shown, the assembly includes a main body 100 with an opening 101 for externally adjustable laser focusing; a sliding lens holder 120 for holding a collimating lens 122 with a longitudinal slot 123 and four alignment holes 124; a (protruding) lock key 106 (for example, a pin or a screw) serves as a key to prevent the rotation of the lens holder 120; a focusing ring 110 having the matching internal threads 111 with the lens holder 120; a lens lock 127 to hold the lens in place; an alignment holder 130; a laser disk 140 having a spherical alignment joint; a laser source 145; two alignment screws 142 placed 90 degrees apart; two alignment springs 143 placed 90 degrees apart opposite to the alignment screws 142; a laser alignment base 150 with four alignment screw holes 155; and a battery compartment 160 for power supply.

Figure 8:
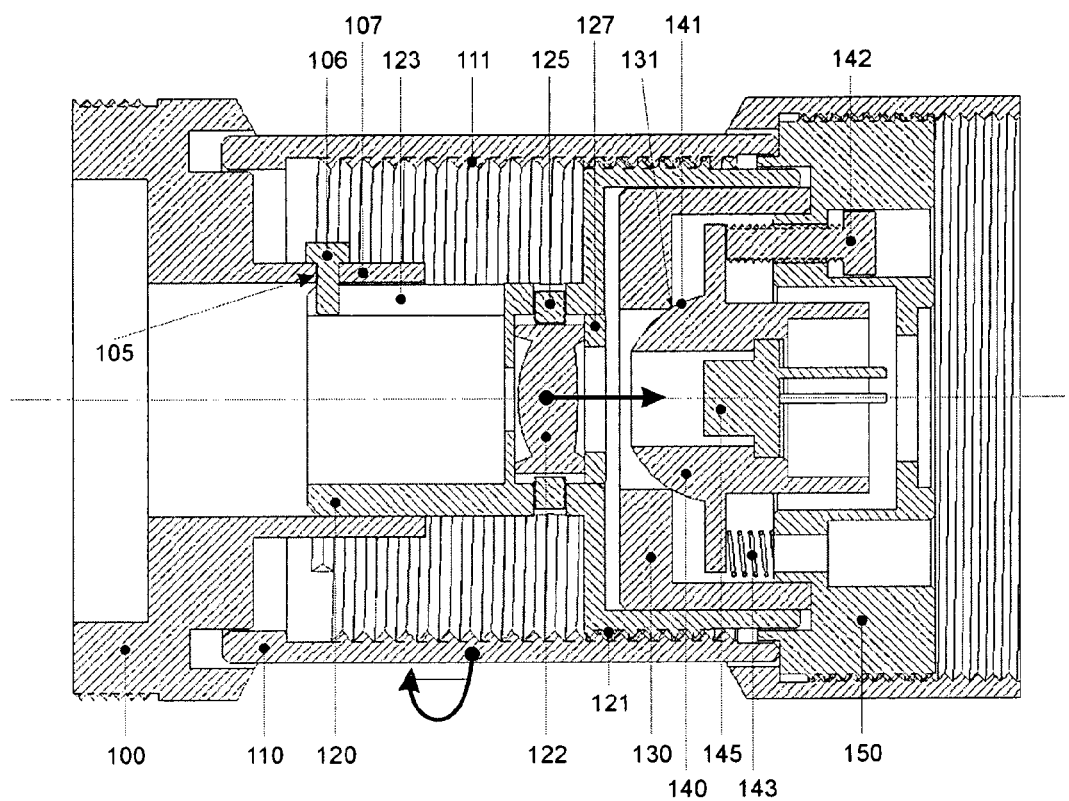
FIG. 8 is an exemplary cross-section view of focusing the laser collimator assembly of FIG. 7.
Figure 9:
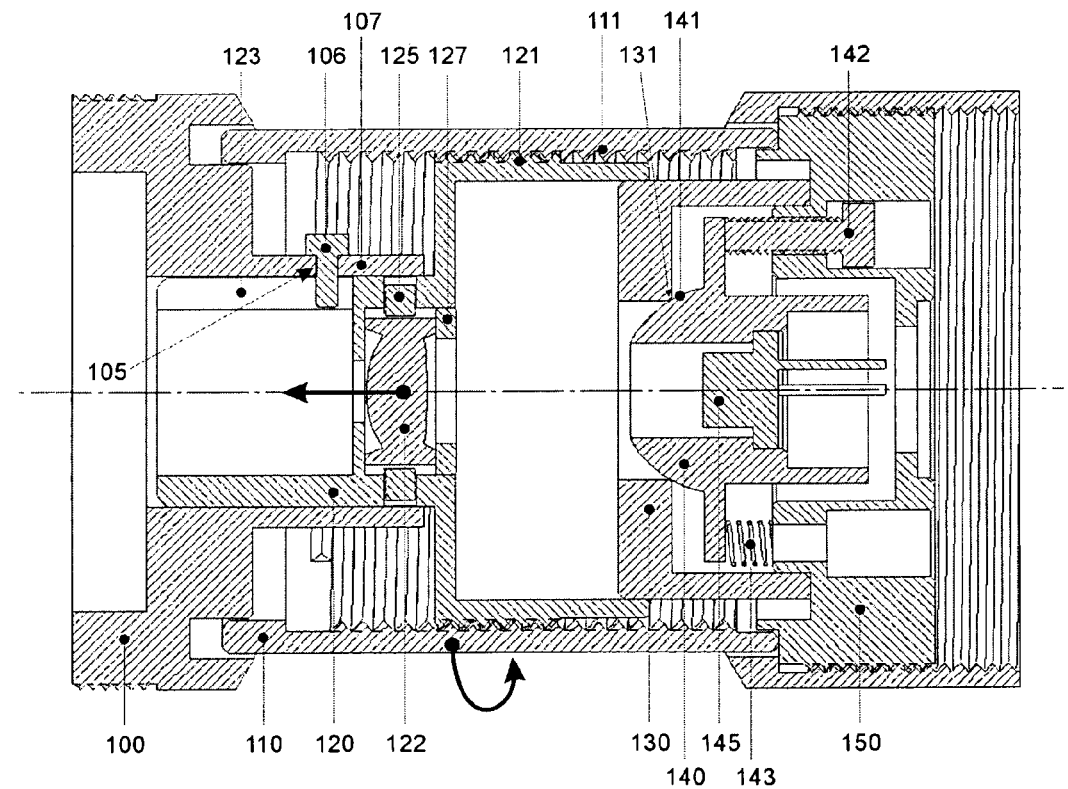
FIG. 9 is an exemplary cross-section view of de-focusing the laser collimator assembly of FIG. 7.

FIGS. 8 and 9 illustrate a mechanism by which collimating lens 122 is hold in place, without rotation during the focusing stage. Since the focusing ring 110 is threadedly received by means of the interaction of the interior threads 111 with the external threads 121 of the lens holder 120, rotation of the focusing ring 110 causes relative longitudinal motion between the focusing ring 110 and lens holder 120. The longitudinal displacement of the focusing ring 110 forces the sliding lens holder 120 to move away or toward the light source 145.

A smaller diameter at front of the sliding lens holder 120 is constrained in the stationary main body inner tube 107 which allows only forward or backward movement. The longitudinal slot 123 at the front of the sliding lens holder 120 receives the protruding lock pin 106 installed in a hole 105 located on the main body inner tube 107 to assure the sliding lens holder 120 slide without rotation with respect to the threading of the focusing ring 110.

FIG. 10 illustrates a mechanism for positioning the optical axis of collimating lens to the main body center axis. The lens lock 127 sandwiches the collimating lens 122 in a larger diameter cavity on the lens holder 120. The lens is friction clamped by the lens lock 127. This sandwich configuration allows the collimating lens 122 to only move slightly in a plane orthogonal plane to the optical axis (x-y plane) with the help of four alignment screws 125 on the lens holder 120.

FIG. 11 illustrates a mechanism aligning the laser pointing direction for correcting laser diode manufacturing pointing errors. In order to align the pointing direction of the laser 145, the laser 145 needs to be positioned at the precise mechanical center of its spherical front portion 141 in the laser disk 140. The spherical surface serves as a mechanical angular adjustment reference plane allowing only the angular adjustment without position displacement. As a result, the spherical front 141 allows the laser to pivot its pointing without shifting its x-y-z position, that is, without displacement along the optical axis or in a plane orthogonal to the optical axis.

In FIG. 11, the spherical front 141 is placed against the circular opening of the alignment holder 131 from the spring force of the alignment spring 143 pushing against the back of the laser disk 140. If the alignment screw 142 is retracted (loosen), the laser disk 140 tilts up. Alternatively, if the alignment screw 142 is fastened (tightened), the laser disk 140 tilts down. The sphere 141 stays at its optical center holding by the alignment holder's circular alignment opening 131, but laser 145 located at the center of the sphere points up without shifting its position in space. In other words, the convex surface of the sphere 141 is rotatable within the circular opening 131 allowing the laser to pivot and rotate without deviating its position along the optical axis.

FIGS. 12 and 13 are the perspective view illustrating the interaction between the alignment holder 130, laser disk 140, alignment screws, and alignment springs. Two 90 degrees apart alignment screws 142 and alignment springs 143 allow the pointing correction in all axis. By fastening the alignment screws 142 in or out, the pointing error of the laser 145 is corrected for accurate alignment of the laser collimator. Although, there are two alignment screws 142 and two alignment springs 143 shown in this embodiment, other number of alignment screws and alignment springs are possible.

In one embodiment, when aligning the focuser and secondary mirror of a telescope, the focuser needs to be fitted square to the telescope's main tube first and then the mechanical location of secondary mirror. In other words, it needs to aim correctly to the main tube's geometric orthogonal axis and then follow through the secondary mirror's optical axis. The first step is to physically mark the exact location of focuser center axis on the opposite side of the inner main tube. Then project the laser image and align accordingly to the precise marked spot with the assistance of the viewer. Next, install and align the physical location of the center-marked secondary mirror and align accordingly with the assistance of the viewer to the marked spot. Finally, align the optical axis of the secondary mirror to the precise center location with the assistance of the viewer.

In one embodiment, a viewing tube with an optical axis perpendicular to the laser projecting alignment axis and an opening in the center of approximately 45 degree reflecting mirror allows the laser beam to pass through without disrupting the quality and efficiency of the laser beam. The optical element is then aligned with the viewing tube in response to the projecting image on the surface of the optical element. An optional adjustable focusing optics allows viewing the projected image on the surface of the optical element located at a variable distance. Although, the above exemplary embodiment is described as having the optical axis of the viewing tube being perpendicular to the laser projecting alignment axis, one skilled in the art would realize that the angle of the optical axis of the viewing tube with the laser projecting alignment axis can be an angle other than 90 degree. In that case, the opening in the center may be at a corresponding angle other than approximately 45 degree.

Figure 14:
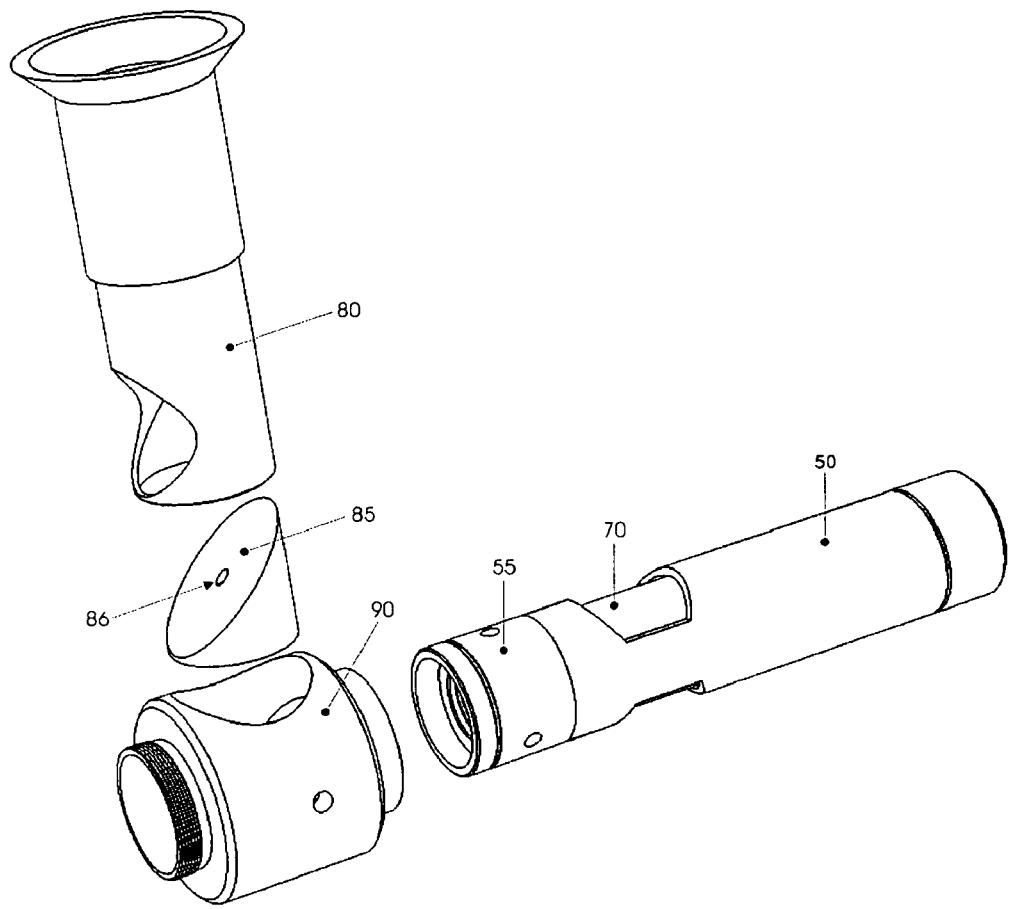
FIG. 14 is an exemplary perspective view of an installed viewing tube in a viewer.
Figure 15:
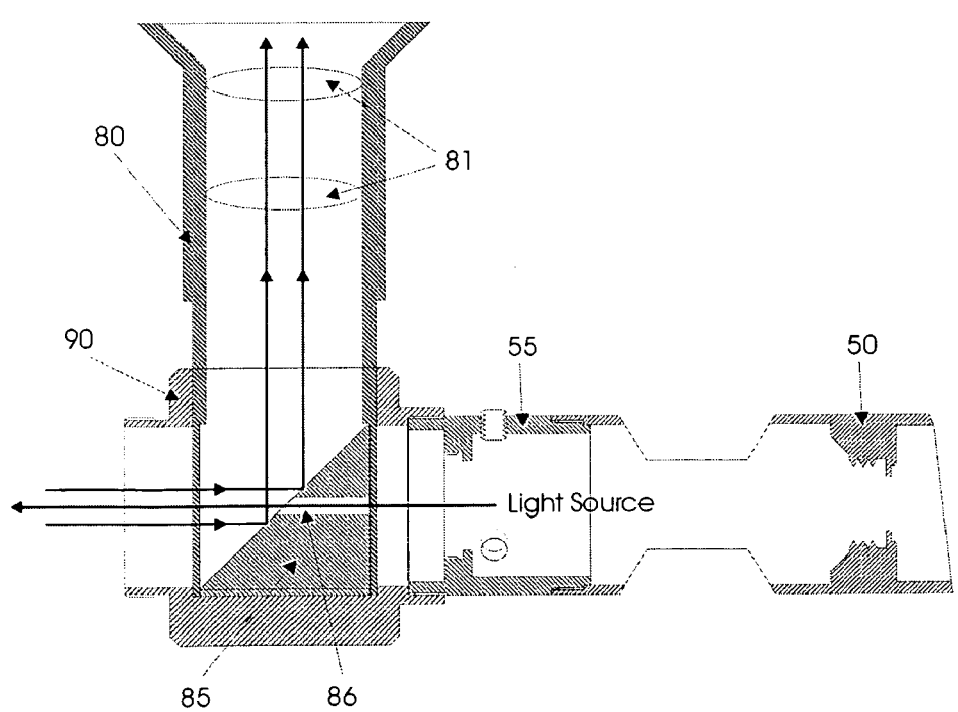
FIG. 15 is an exemplary cross-section view of the installed viewing tube in a viewer.

FIG. 14 is a perspective view of a viewing tube components and a viewer, and FIG. 15 is a side view of an installed viewing tube. As shown in FIGS. 14 and 15, a viewer according to one embodiment of the present invention comprises a cored mirror 85, a variable focusing eye piece focuser 81. In one embodiment, the variable focusing eye piece has a viewing tube 80 and an adjustable grip for a user to twist the top portion of the viewer tube and adjust the distance of the two lens to focus at a precise viewing distance, for example, at an inner wall of the telescope main tube for focuser pointing alignment, and surface of the the secondary mirror for mechanical positioning of the secondary mirror. The mirror 85 is installed preferably in an approximately 45-degree angle to the viewing axis of the viewing tube 80. A center hole 86 is opened in the parallel direction of the laser beam. The opening allows the laser beam passing through without any obstruction and degrading of the output efficiency to the projecting image. The viewer tube 80 is then inserted in the same location of the viewing screen 90. An eye piece focuser 81 is optically constructed to focus at distance, for example 6 inches to 5 feet preferably, where the focusing range is defined by the distance from the eye piece to the secondary and primary mirror in most telescopes.

Adding a cored diagonal mirror at the returning viewing screen enables the viewing of the projecting laser on the optical element for precise alignment reference. This is especially effective for the secondary mirror and the eyepiece draw tube alignment. The viewing mirror is enhanced with focusable eyepiece which allows the user to focus and magnify the projecting laser image on the surface of the projecting optical element to achieve even higher calibration resolution.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A focusable laser collimator comprising:
   an optical lens having an optical axis;
   a sliding lens holder for housing the lens, the sliding lens holder having a smaller diameter at a front and a larger diameter at a back and having a longitudinal opening parallel to the optical axis;
   a stationary lens holder ring for fitting to the front of the sliding lens holder and having a protruding key for receiving the longitudinal opening;
   a laser holder tube for holding a laser and having an external thread on an outer circumferential surface; and
   a focusing ring for receiving the back of the sliding lens holder and having internal thread on an internal circumferential surface,
   wherein when the focusing ring is rotated, the internal thread of the focusing ring interacts with the external thread of the laser holder tube to move the focusing ring along the optical axis and the protruding key travels within the longitudinal opening while preventing the sliding lens holder from rotating.

2. The focusable laser collimator of claim 1 further comprising a spring placed between the laser holder tube and the sliding lens holder.

3. The focusable laser collimator of claim 1 further comprising a housing having a centered longitudinal axis and pair of alignment keys for shifting x and y positions of the sliding lens holder about the optical axis relative to the centered longitudinal axis of the housing.

4. The focusable laser collimator of claim 1, wherein the protruding key is a screw.

5. The focusable laser collimator of claim 1 further comprising a viewing tube for viewing a projected laser beam of the laser along a viewing axis.

6. The focusable laser collimator of claim 5, wherein the viewing tube comprises a mirror placed in the viewing tube forming an angle with the viewing axis and an eye piece focuser, wherein the mirror includes a hole at its center to allow the laser beam pass through and the mirror reflects a projected image on a surface.

7. A focusable laser collimator comprising:
   an optical lens having an optical axis;
   a sliding lens holder for housing the lens having a longitudinal opening parallel to the optical axis;
   a stationary lens holder ring for fitting to the front of the sliding lens holder and having a protruding key for receiving the longitudinal opening; and
   a focusing ring movable along the optical axis, wherein the protruding key placed within the longitudinal opening prevents the sliding lens holder from rotating.

8. The focusable laser collimator of claim 7 further comprising a lens housing for holding the lens steady along the optical axis and a plurality of alignment keys for moving the lens in a plane orthogonal to the optical axis.

9. The focusable laser collimator of claim 7, wherein the protruding key is a pin or a screw.

10. The focusable laser collimator of claim 7 further comprising a viewing tube for viewing a projected laser beam of the laser along a viewing axis.

11. The focusable laser collimator of claim 10, wherein the viewing tube comprises a mirror placed in the viewing tube forming an angle with the viewing axis and an eye piece focuser, wherein the mirror includes a hole at its center to allow the laser beam pass through and the mirror reflects a projected image on a surface.

12. The focusable laser collimator of claim 7 further comprising:
- a laser disk for holding a laser and having a spherical front with a hole for allowing the beam of the laser to pass through; and
- an alignment holder having a circular alignment opening at a front center, wherein the laser disk is rotatable within the circular alignment opening allowing the laser to pivot and rotate without displacement along the optical axis or in a plane orthogonal to the optical axis.

13. The focusable laser collimator of claim 12 further comprising an alignment screw for pivotally rotating the spherical front of the laser disk within the circular alignment opening.

14. The focusable laser collimator of claim 12 further comprising an alignment spring placed against a back of the laser disk.

* * * * *